Patented Apr. 1, 1924.

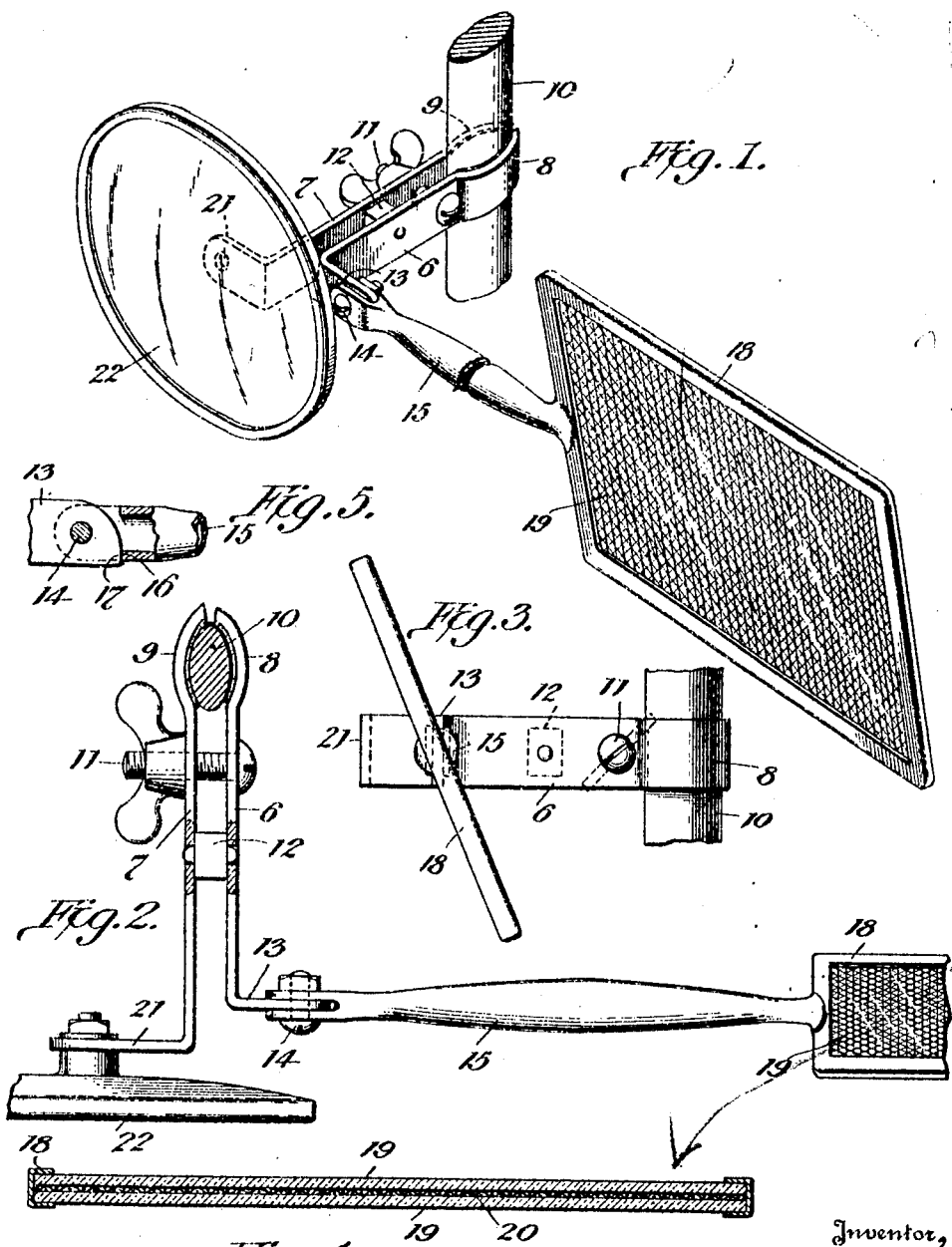

1,488,986

UNITED STATES PATENT OFFICE.

WILLIAM S. HOOD, OF SAN ANTONIO, TEXAS.

LIGHT SHIELD FOR AUTOMOBILES.

Application filed July 5, 1922. Serial No. 573,051.

*To all whom it may concern:*

Be it known that I, WILLIAM S. HOOD, a citizen of the United States, residing at San Antonio, in the county of Bexar and State of Texas, have invented certain new and useful Improvements in Light Shields for Automobiles, of which the following is a specification.

The present invention relates to means for preventing the glaring light from the approaching head-lamps of automobiles and the like, from blinding the operator of an automobile traveling in the opposite direction, and the object is to provide a shield that may be successfully employed for the purpose, and at the same time is so located that unobstructed vision may be obtained on all sides of the same. A further object is to provide means of this character that can be readily attached to the automobile and will also serve as a support for a mirror that will give a rear view.

In the accompanying drawings:—

Figure 1 is a perspective view of the invention, showing the novel structure in place, Figure 2 is a plan view partially in section, Figure 3 is an end elevation, Figure 4 is a longitudinal sectional view through the shield, Figure 5 is a detail sectional view of the pivot mounting for the shield-carrying arm.

In the embodiment disclosed, a clamp is employed, comprising two members in the form of brackets 6 and 7, having oppositely disposed jaws 8 and 9 adapted to embrace the frame bar 10 of an automobile windshield, or other suitable part. The members are drawn together by a suitable clamping bolt 11, and have interposed between them a bearing block 12.

One of the brackets 6 is provided with an outstanding ear 13, on which is pivotally mounted, as shown at 14, a shield carrying arm 15. As illustrated in Figure 5, the arm 15 is preferably provided with a stop shoulder 16 adapted to abut against a similar shoulder 17 formed on the ear 13 to position the arm 15 in substantially horizontal position when swung down. Obviously said arm may be swung to a vertical position. On the free end of the arm is carried the light shield. This preferably comprises a rectangular metallic frame 18 which encloses and holds glass or other transparent sheets 19. Between these sheets is located a sheet of foraminous fabric 20, preferably colored netting. It will be noted by reference to Figures 1, 2 and 3 that the shield is tilted or is out of a vertical plane. This has been found desirable in connection with the use of the device.

The other clamp bracket 7 is provided with an outstanding ear 21 on which may be suitably mounted any well known or desired type of mirror 22.

Obviously the structure as disclosed can be conveniently mounted upon the wind shield frame of an automobile, the mirror being on the outer side so as to reflect a view from the rear, while the shield can be swung from a vertical position out of the line of vision of the operator to a position across said line of vision. When so positioned the fabric set at an angle as illustrated and preferably colored, will cut out the blinding rays of light from an approaching automobile, but will give a plain view of the car and also a proper view of the road ahead of the automobile. The device moreover permits an unobstructed view above, below and at the ends of the shield.

From the foregoing, it is thought that the construction, operation and many advantages of the herein described invention will be apparent to those skilled in the art, without further description and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. A device of the character set forth comprising frame engaging clamp members lying parallel to each other, means for clamping said members against the frame, a spacing means between said members, the free ends of said clamp members being turned outwardly, a light shield carried by one of said free ends, and a mirror carried by the other free end.

2. A device of the character set forth comprising frame engaging clamp members lying parallel to each other, means for clamping said members against the frame, spacing means between said members beyond said clamping means to keep the free ends separated, the free ends of said members being turned outwardly in opposite directions, a mirror carried by one of the free ends, and an arm carrying a light shield adjustably carried by the other free end.

In testimony whereof I affix my signature in the presence of two witnesses.

WILLIAM S. HOOD.

Witnesses:
O. R. WOOD,
RICHARD SURKAMP.